United States Patent
Felsenstein et al.

(10) Patent No.: US 7,257,506 B2
(45) Date of Patent: *Aug. 14, 2007

(54) POSITION DETECTING SYSTEM AND METHOD

(75) Inventors: Lee Felsenstein, Palo Alto, CA (US); Steven E. Saunders, Cupertino, CA (US)

(73) Assignee: Vulcan Patents LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/007,067

(22) Filed: Dec. 7, 2004

(65) Prior Publication Data

US 2005/0110359 A1  May 26, 2005

Related U.S. Application Data

(63) Continuation of application No. 09/838,708, filed on Apr. 18, 2001, now Pat. No. 6,838,872.

(51) Int. Cl.
*G01L 25/00* (2006.01)
*G01B 7/14* (2006.01)

(52) U.S. Cl. .................... 702/115; 324/207.17

(58) Field of Classification Search ............. 702/115, 702/112, 116; 310/184; 324/207.17, 207.16, 324/207.15
See application file for complete search history.

(56) References Cited

U.S. PATENT DOCUMENTS

| | | | |
|---|---|---|---|
| 3,827,291 A | 8/1974 | McCalvey | 73/779 |
| 4,482,784 A * | 11/1984 | Whetstone | 178/18.06 |
| 4,689,448 A * | 8/1987 | Snyder et al. | 178/18.07 |
| 4,697,144 A | 9/1987 | Howbrook | 324/207.17 |
| 5,194,699 A * | 3/1993 | Zalenski | 178/18.07 |
| 5,434,504 A * | 7/1995 | Hollis et al. | 324/207.17 |
| 5,486,731 A | 1/1996 | Masaki et al. | 310/180 |
| 5,523,683 A | 6/1996 | Okamoto et al. | 324/207.17 |
| 5,583,435 A | 12/1996 | Takemoto et al. | 324/207.17 |
| 5,606,329 A | 2/1997 | Ramotowski et al. | 343/709 |
| 5,611,534 A | 3/1997 | Takemoto et al. | 370/471 |
| 5,815,091 A | 9/1998 | Dames et al. | 340/870.34 |
| 6,005,387 A | 12/1999 | Andermo et al. | 324/207.17 |
| 6,043,644 A | 3/2000 | de Coulon et al. | 324/207.18 |
| 6,124,708 A * | 9/2000 | Dames | 324/207.12 |
| 6,249,234 B1* | 6/2001 | Ely et al. | 341/20 |
| 6,489,899 B1* | 12/2002 | Ely et al. | 341/20 |
| 6,545,461 B1* | 4/2003 | Miyata | 324/207.17 |
| 6,636,035 B2* | 10/2003 | Kiriyama et al. | 324/207.17 |
| 6,642,711 B2* | 11/2003 | Kawate et al. | 324/207.17 |
| 6,690,156 B1* | 2/2004 | Weiner et al. | 324/207.17 |
| 6,838,872 B1* | 1/2005 | Felsenstein et al. | 324/207.17 |
| 6,888,538 B2* | 5/2005 | Ely et al. | 345/173 |

\* cited by examiner

*Primary Examiner*—John Barlow
*Assistant Examiner*—Toan M. Le
(74) *Attorney, Agent, or Firm*—Perkins Coie LLP

(57) ABSTRACT

A position detection system for locating an object including a magnetic field generator is disclosed. The position detection system also includes an array of parallel conductors responsive to a magnetic field generated by the magnetic field generator and a plurality of receivers each associated with a parallel conductor. The parallel conductors are spaced apart from one another by a substantially constant spacing. Each receiver has an associated gain, and the gains of the receivers are configured to simulate voltages induced in conductor loops of sinusoidally-varying pitch.

12 Claims, 11 Drawing Sheets

POSITION DETECTING SYSTEM AND METHOD

CROSS REFERENCE TO OTHER APPLICATIONS

This application is a continuation of U.S. patent application Ser. No. 09/838,708, entitled "POSITION DETECTING SYSTEM AND METHOD" filed Apr. 18, 2001 now U.S. Pat. No. 6,838,872 which is incorporated herein by reference for all purposes.

FIELD OF THE INVENTION

The present invention relates generally to non-contact position sensing of objects, and more specifically to electromagnetic sensing systems for locating objects.

BACKGROUND

Non-contact position sensing finds is used in many applications, such as determining the position of an elevator in an elevator shaft, encoding the position of a stylus on a graphic tablet, and determining the positions of pieces on a game board. Examples of systems that detect the position of an object and encode its position are disclosed in U.S. Pat. No. 5,815,091, entitled "POSITION ENCODER" issued to Dames et al. on Sep. 29, 1998, which is hereby incorporated by reference, U.S. Pat. No. 4,005,396, entitled "DIGITAL DISPLACEMENT SENSOR WITH ZIGZAG COILS" issued to Fujiwara et al. on Jan. 25, 1977, which is hereby incorporated by reference, and U.S. Pat. No. 6,124,708, entitled "POSITION DETECTION USING A SPACED APART ARRAY OF MAGNETIC FIELD GENERATORS AND PLURAL SENSING LOOP CIRCUITS OFFSET FROM ONE ANOTHER IN THE MEASUREMENT DIRECTION" issued to Dames on Sep. 26, 2000, which is hereby incorporated by reference.

Fujiwara describes a system using a movable element having a coil connected to an AC (alternating current) source. A stationary element, such as a tablet, has a number of windings mounted on its surface, and the windings have different periods. The position of the movable element relative to the stationary element is determined by the variation in mutual inductance between the coil and the windings. When the coil is energized, the magnitude of the current induced in a winding depends on the position of the coil relative to the winding, producing a signal that can be used by the system to determine the position of the movable element. Other systems may use different configurations of windings, but are similar in that the movable element has a coil that is energized to induce the signal in the windings of the stationary element.

Dames discloses a system comprising a support upon which a pair of phase quadrature windings is mounted. The windings are arranged to have a sinusoidal magnetic sensitivity characteristic along the length of the support. A movable element has a resonant circuit including a coil and capacitor that can magnetically couple with the windings. Excitation of the circuit induces currents in the windings that are dependent upon the position of the circuit within a period of the windings, and the system can determine the position of the movable element with respect to the support along an axis. A similar pair of windings is arranged on the support, orthogonal to the first pair of windings, to provide position detection along an axis orthogonal to the first. Thus, the system is able to detect the x-y position of the movable element with respect to the support.

However, such systems have shown limitations in the maximum size of the sensing area and the number of individual objects that can be detected simultaneously. This requires either limiting the size of the entire system or reducing the number of distinct movable objects in the system. It is also possible to construct a system using a series of adjacent sensing subsystems, but such a system would have uneven response at the junctions between subsystems, resulting in reduced accuracy and precision in detecting and encoding the positions of objects.

There exists a need, therefore, for an improved system and method for accurately detecting the position of objects in a large sensing area.

SUMMARY OF THE INVENTION

A system and method for detecting the position of an object are disclosed. A position detection system for locating an object including a resonator comprises an array of parallel conductors responsive to the magnetic field from the resonator, and a plurality of receivers each associated with a parallel conductor. The array of parallel conductors is configured to locate the object along a measurement path. The array of parallel conductors is orthogonal to the measurement path. The system further comprises a plurality of drivers each associated with a parallel conductor and configured to drive current through to produce an energizing field. The array of parallel conductors is provided with sinusoidally varying spacing and driven with sinusoidally varying current. In one embodiment, the array of parallel conductors is provided with constant spacing and the receivers are configured with gain factors to produce reception similar to reception by sinusoidally spaced conductors. The array of parallel conductors may be driven with three-phase currents to eliminate stationary null points in the energizing field along the lengths of the parallel conductors.

A method of detecting the position of an object including a resonator comprises providing an array of parallel conductors, providing a plurality of receivers, and associating each of the receivers with a parallel conductor.

Other features, advantages, and embodiments of the invention will be apparent to those skilled in the art from the following description, drawings, and claims.

DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, the invention will be described in its application to a planar position detector, and details relating to technical material that are known in the technical fields related to the invention have not been included.

In utilizing electromagnetic planar sensing systems to sense the position of movable objects comprising magnetic field generators in the form of LC (inductor-capacitor) or inductively-coupled piezoelectric resonators, as described in Dames, limitations have been observed in the size of the sensing area and number of resonators simultaneously distinguishable. These limitations are due to the fact that to be distinguished from the other resonators, each resonator must be tuned to a different frequency and the frequency of excitation of the array must be tuned to each resonator's frequency in turn. Systems of this sort have been built and marketed as board games by Zowie Intertainment in San Mateo, Calif.

A typical system works through the generation of magnetic fields having sinusoidally varying amplitude in one dimension. To generate such a field, the system has a planar coil laid out having a density of turns that varies with the dimension in question, similar to that shown in FIG. 1. Thus, at one point along the axis in question, magnetic flux is generated by several turns, and at a different point, the flux is generated by fewer turns. The effect is that the amplitude of the flux sensed at any given point will vary sinusoidally as the point is moved along the sensing axis, and will remain constant as the point is moved at right angles to this axis. Four windings are used in each axis, with two arranged in quadrature phase relationship (offset along the sensing axis by a quarter period), and two similar to the first two, except that they have a spatial period differing by one across the board. Thus, one set might have four periods, while the other set has three periods. These coils are used on a time-multiplexed basis for receiving signals from movable resonators, as well as for exciting those resonators.

Figure 1:
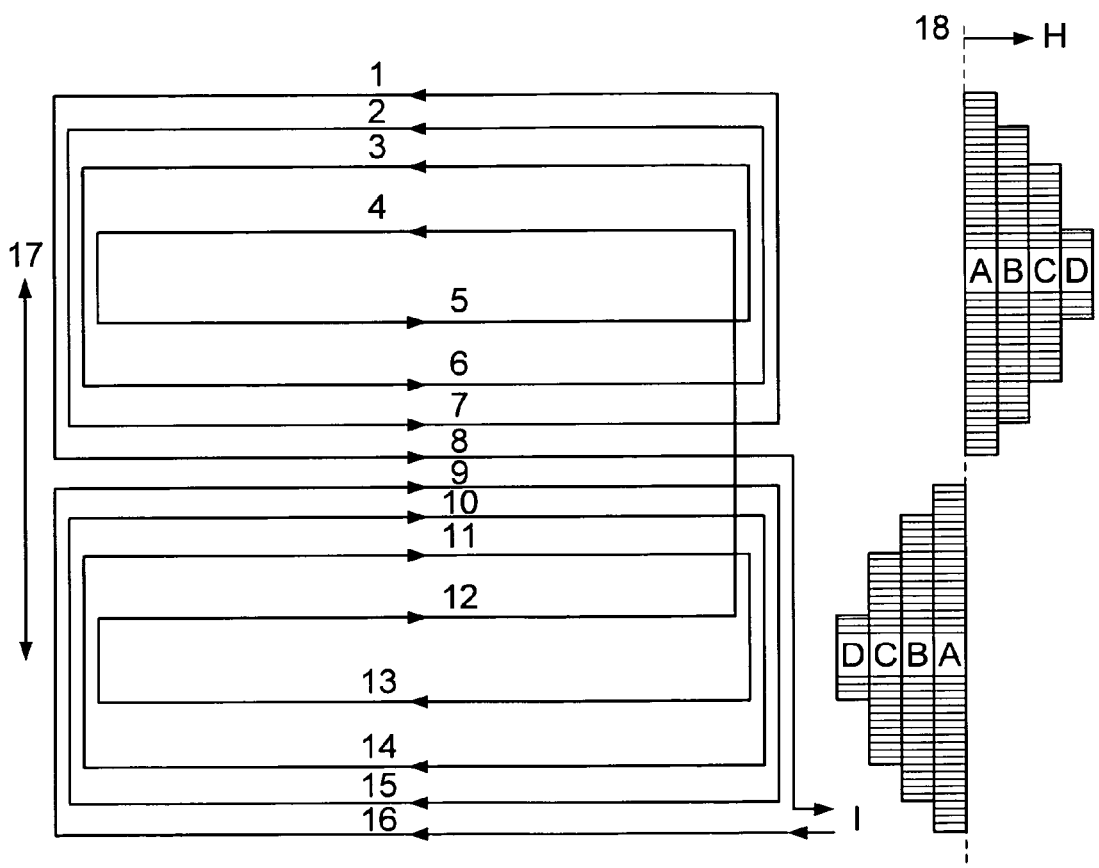
FIG. 1 is a schematic illustrating a typical arrangement of windings for detecting the position of an object, with a graph of magnetic field intensity shown adjacent to the schematic.

FIG. 1 illustrates a typical arrangement of windings 1-16 for detecting the position of the resonator (not shown). Also shown on the side is a graph 18 of the magnetic field intensity resulting from current in the conductor. A current I enters conductor 16 and exits from conductor 8, flowing through all of the conductors, which are connected in series by vertical conductors at each end. The graph 18 of magnetic field intensity shows the contributions that each pair makes to the overall field intensity. Bar A shows the contribution from conductors 1 and 8 in the upper half, and conductors 9 and 16 in the lower half. The polarity of the magnetic field is opposite in each half (upper and lower), because the direction of current flow reverses in each half.

Because each pair of conductors represents one turn and because the current is the same in all turns, the amplitude contribution from each conductor pair is identical. Bar B on the magnetic field intensity diagram 18 represents the contribution of conductors 2 and 7, while Bar C represents the contribution of conductors 3 and 6. Bar D indicates the contribution of conductor pairs 4 and 5.

The contribution from each conductor pair adds to the contributions of the others outside it, resulting in a stacking effect in the diagram 18. If the pitches of the conductor pairs are appropriately adjusted, the magnetic field intensity profile may be shaped to approximate a sine wave.

It may be appreciated that, due to the symmetric nature of linear systems, the field intensity graph 18 also represents the amplitude response to externally-generated magnetic fields that induce a current in the conductor patterns.

It is important that the conductor loops form the dominant path for current flow, and that no significant currents flow through stray capacitances that exist in any physically realizable configuration. Such stray capacitances will have the effect of causing currents to be diverted from the intended conductors to ground or to other conductors. Because alternating current flow through a capacitance is directly proportional to the frequency of the current, it is important to keep the frequency of operation as low as possible.

Experience has shown that a practical upper limit for frequency in location systems using the principles taught in Dames is equal or less than 0.2Fo, where Fo is the frequency of self-resonance of the conductive loops 1-16.

As these conductor loops 1-16 are made physically larger, the self-resonant frequency decreases. This is due to both the additional inductance of the loop conductors and the additional capacitance between overlapping conductors, especially between conductors of spatially orthogonal sets of conductor loops which must necessarily intersect and overlap with each set of conductor loops in a planar position sensing system The lower self-resonant frequency means that resonators must be built for lower frequencies and the system must operate with reduced receive amplitudes, since the inductively-coupled current received results in a voltage that is directly proportional to the frequency. The lower voltage results in reduced precision in processing the signal.

In addition, component tolerance in manufacture of resonators limits the allowable spacing of resonator frequencies for low-cost systems. Thus, it is difficult to build a functional planar sensing system using this technology with large areas and adequate numbers of distinct resonators. The self-resonant frequency of the coils limits the useful size of the plane to approximately 11 inches by 17 inches, because increasing size will lower the self-resonant frequency, and the bandwidth of frequencies usable for sensing must fall below the self-resonant frequency. One may build an array of adjacent smaller sensing arrays, but discontinuities at the junctions between sensing arrays cause uneven and sometimes non-monotonic spatial response.

The techniques described herein provide the ability to construct large planar sensing systems (table-sized, for example) operable with large numbers of discrete objects incorporating magnetic field generators in the form of resonators, as will be described herein The effective inductance of the loop conductors 1-16, which contributes to the self-resonance of the conductors, cannot be reduced by any means that would reduce the strength of the energizing magnetic field generated by the loop conductors, because the system requires generation of magnetic fields to operate. Another approach is to reduce the length of the conductors through which the energizing current is sent, so as to reduce inductance. The conductor should be as long as the span of the sensing plane in the direction orthogonal to the axis 17 along which sensing takes place.

Figure 2:
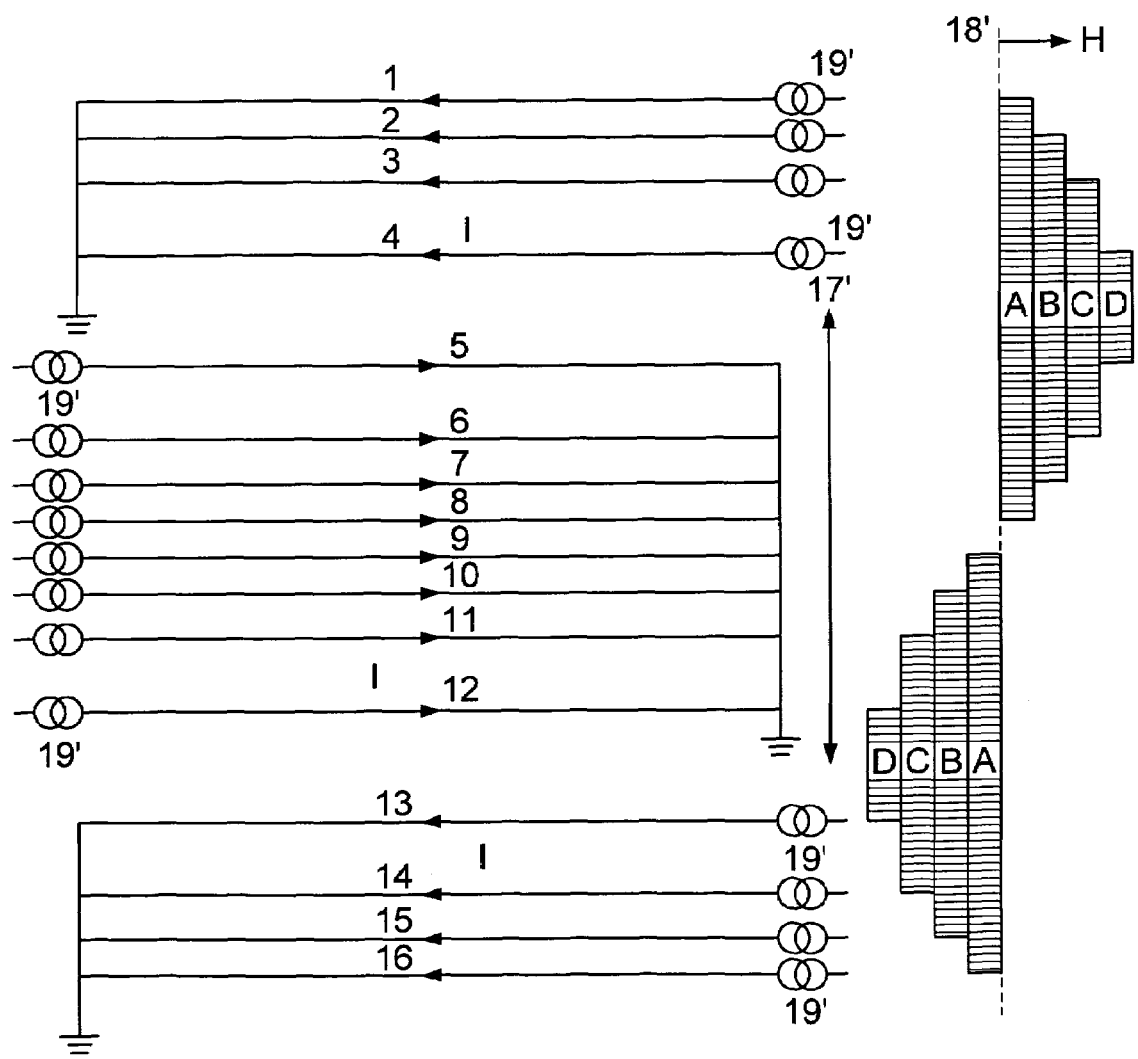
FIG. 2 is a schematic illustrating an arrangement of windings in accordance with an embodiment of the invention, with a graph of magnetic field intensity shown adjacent to the schematic.

A planar sensing system comprises a plurality of parallel single conductors 1'-16' spanning the sensing plane, with driver electronics 19' located at the end of each, as shown in FIG. 2. For the sake of clarity, the schematic illustrates only one set of parallel conductors 1'-16', for sensing position along an axis 17 orthogonal to the conductors 1'-16'. The other set of parallel conductors, which would be for sensing position along an axis orthogonal to the first axis, and would be orthogonal to the first set, has not been shown in FIG. 2. Additionally, the parallel conductors 1'-16' may each be driven separately by a driver 19', as shown and described above, or may be driven in pairs by a single driver 19'. In the latter configuration, the driver 19' sends a current through one conductor, and the current returns through the other conductor, forming a single loop. In either case, these conductors may take the form of insulated wires affixed to a substrate, or may be formed by printed circuit layers as is well known in the art. Successive layers may be formed with an insulator between them, and via holes used to connect them.

It will be appreciated that FIG. 2 shows the pattern of FIG. 1 truncated so as to remove the vertical conductors that interconnect the ends of each horizontal conductor. A graph 18' of the energizing magnetic field intensity resulting from current in the conductors is also shown. The conductors 1'-16' are connected to a common ground at one end and driven by constant current sources 19'. These sources 19' drive a current I through each conductor.

The field intensity diagram 18' in this figure is identical to the field intensity diagram 18 in FIG. 1, because the spacing of the conductors is identical in both cases as is the current. If the spacing of parallel conductors 1'-16' varies according to the sine of the conductor position along the axis 17', the drive current may be increased in conductors that are relatively far apart and decreased in conductors that are more closely spaced, according to the cosine of the conductor position Another embodiment is shown in FIG. 3, which depicts an array of conductors 20-43 having constant pitch and being driven by different currents, along with a graph 44 of magnetic field intensity resulting from one pattern of currents.

Figure 3:
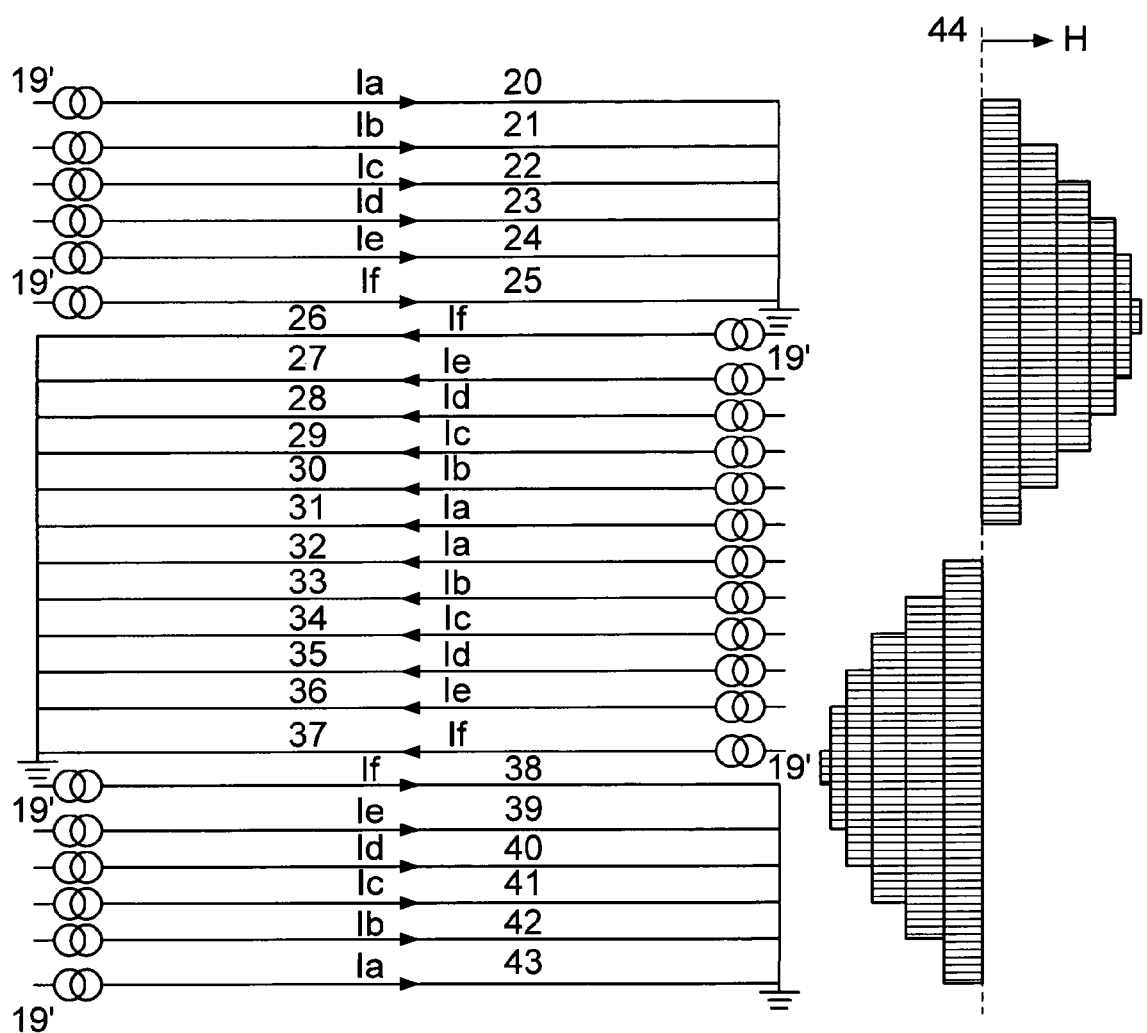
FIG. 3 is a schematic illustrating an arrangement of windings in accordance with another embodiment of the invention, with a graph of magnetic field intensity shown adjacent to the schematic.

In FIG. 3, the currents are represented by six subscripted values of I ($I_A$ through $I_F$). Each value of I is identical to all of those having the same subscript, and the arrows indicate that the direction of current flow varies in some conductor groups. The magnetic field intensity graph 44 shows the contribution of each pair of conductors. Conductor pair 20 and 31 is responsible for the contribution nearest the baseline, followed by conductors 21 and 30, 22 and 29, 23 and 28, and so on. The polarity of the magnetic field in the lower half of the diagram 44 is opposite that of the field in the upper half.

The magnetic field amplitude contribution from each conductor pair is dependent upon the current amplitude. Unlike the configurations shown in FIGS. 1 and 2, obtaining a desired sinusoidal current profile requires appropriate shaping of the current amplitude, indicated by the differing thickness of the bands in the magnetic field intensity diagram 44 (because the magnetic field contribution depends on the current amplitude). Also, the effect of the sinusoidally-varying pitch of conductor loops may be simulated by applying a weighting function to the voltages induced between pairs of parallel conductors by energy coupled from the movable resonator.

This approach permits a finer resolution of approximation to the desired sinusoidal profile. Also, the spatial frequency and phase of the magnetic pattern can be adjusted by adjusting the profile of driving currents. For example, the array of conductors 20-43 can be driven with identical currents or a profile of currents shaped to simulate a sinusoidally-varying excitation field profile. It will be appreciated that other patterns can be created in this manner, such as triangular and trapezoidal patterns, and different magnetic amplitude profiles can be produced by different profiles of excitation. Further, the frequency of the energizing field may not necessarily be at the resonant frequency of the resonator, and more than one energizing field may be used (so, for example, the resonator could produce a field at a difference frequency between two energizing frequencies simultaneously with the excitation, so that the system may transmit and receive continuously, rather than using sequential pulse-echo operation).

The drivers 19' may be digital in nature, such as CMOS or bipolar totem-pole structures which make a low-impedance connection to either high or low voltage supply points, or they may be linear in nature, controlling the voltage at an end (or both) of the conductor so as to cause, for example, a sinusoidal, triangular, or trapezoidal current through the conductor. In an embodiment of the invention, the drivers may be linear operational amplifiers with disable control such as the AD8083, manufactured by Analog Devices of Norwood, Mass. or where a constant square-wave drive is desired, they may consist of sections of a tri-state digital line driver such as the 74HC244 octal buffer with enable available from a number of manufacturers.

Figure 4:
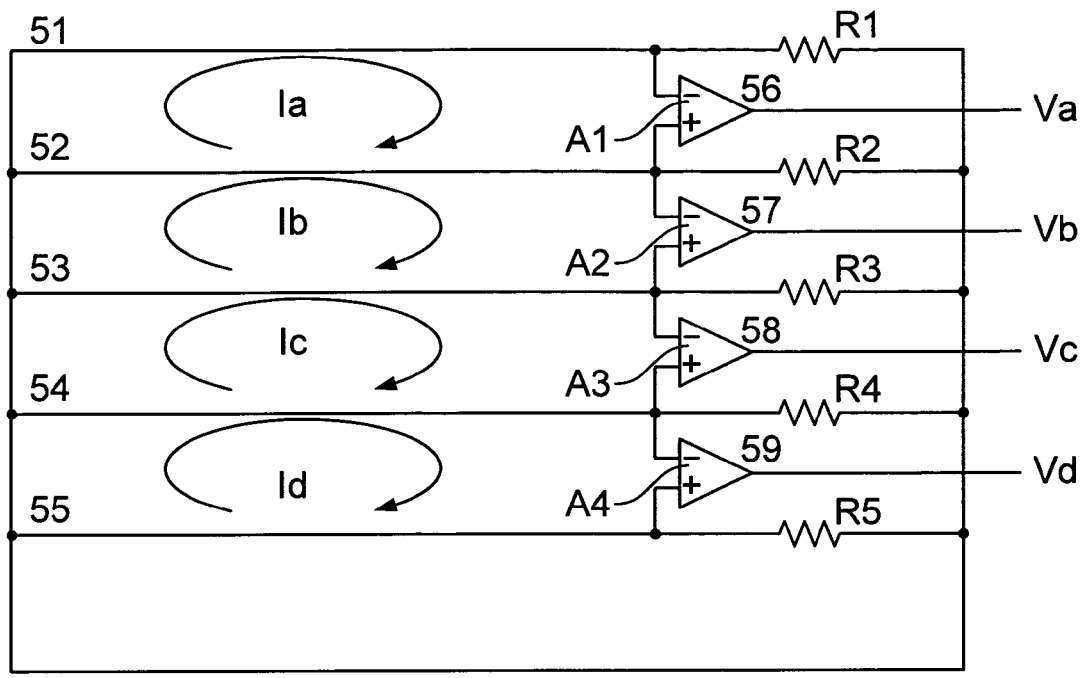
FIG. 4 is a schematic illustrating a receiving array.

In the receive mode, when energy from the resonator is to be received, these drivers 19' may be disabled electronically and placed into high-impedance states, while differential voltages between parallel conductors are sensed by high-gain receiver amplifiers, as shown in FIG. 4. The design of such receivers and drivers has been developed in the field of fixed magnetic computer memories and is well known by those familiar with the field. Differential or instrumentation amplifiers may be used, built from the same linear operational amplifiers with disable control described above. The amplifiers 56-59 will be disabled while the parallel conductors 51-55 are being driven, in order to prevent saturation and long recovery times.

Since for each current sent through a conductor a return current must occur, such return current is best sent through a parallel conductor, thus generating the effect of a loop having a single current flowing in a single conductor. In an embodiment of the invention, such loops may be created by connecting two parallel conductors at one end and by driving current from the other end. Thus, in FIG. 3, conductor 20 carrying current Ia would have its right hand end disconnected from the common ground and would drive the right hand end of conductor 31, which also carries current Ia and would be similarly disconnected from a driver 19'. The same would apply to conductor pairs 21 and 30 (Ib), 22 and 29 (Ic), etc. This same variation could be applied to conductors spaced at a sinusoidally varying pitch, as in FIG. 2.

The self-resonant frequency of a single conductor with drive and sensing electronics at one end will be higher than that of a loop conductor and significantly higher than a system of multiple loops connected in series as described in Dames. Under ideal conditions, the currents sent in each direction along the parallel conductors will be exactly equal, so that they will sum to exactly zero. Under such "balanced" conditions, the drivers may be located at one end of the conductors, the other ends of which need only to be connected together. In an illustration of Kirchhoff's Law, the sum of all currents into this node will be zero.

If, due to variations in tolerance of components or rounding errors in digital-to-analog signal conversion, the sum of currents sent through the parallel conductors is not zero, it may be necessary to provide a conductor through which this "unbalanced current" may return to the circuits that provide power to the drivers of the parallel conductors. If such a return conductor is used, it should be positioned at one end of the parallel conductor array so that its contribution to the magnetic fields generated by the parallel conductors will be that of a constant offset. This arrangement is shown in FIG. 5.

Figure 5:
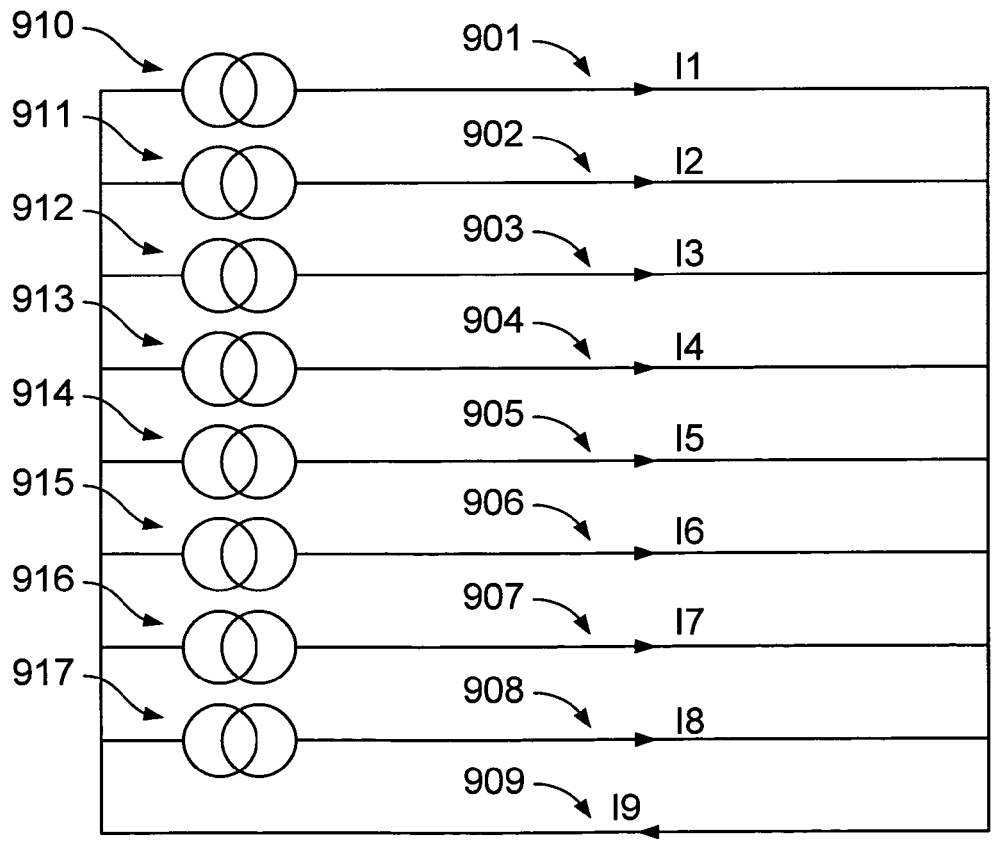
FIG. 5 is a schematic illustrating the array of FIG. 4 with a return conductor.

FIG. 5 depicts an array of eight parallel conductors 901 through 908 driven by constant-current sources 910 through 917. A ninth parallel conductor 909 (the "balancing" return conductor) returns current from the junction of the other conductors to all current sources.

Current sources 910-917 are bi-directional, capable of sourcing current of positive or negative polarity. According to Kirchhoff's Law, the current I9 in conductor 909 will be equal to the sum of currents I1 through I8 in conductors 901 through 908. If all positive currents precisely equaled all negative currents in conductors 901 through 908, then the current I9 would be precisely zero. Since such precision is in practice impossible to attain, there will always be a finite current I9 whenever there are any currents I1 through I8.

This current I9 is the "unbalanced" current from the system of current sources and conductors shown. If conductor 909 is positioned at the end of the array of conductors 901 through 908, current I9 will result in a small constant offset in the magnetic flux profile generated by the currents I1-I8. If conductor 909 is positioned within the array of conductors 901 through 908, the effect of the unbalanced current will be to produce a positive offset in magnetic flux to one side and a negative offset to the other side. Note that if a configuration of multiple single loops with a driver providing a forward and return current in a pair of parallel conductors is used, the balancing conductor will not be needed.

Improved control of the spatial profile of exciting magnetic fields is disclosed herein. In Dames, excitation of the system is effected by an excitation loop (designated 16 in that patent), which surrounds the pickup circuitry. In practice, with larger two-dimensional systems, the size of such a loop becomes large and its field becomes detectable at a distance, subject to distortion by ferromagnetic and conductive objects nearby, and a potential source of electromagnetic interference with electronic equipment.

For this reason, two-dimensional location systems have been built with sequential excitation by loops 13 and 15 of Dames, which are offset in a quadrature phase relationship. As each set of loops (13 or 15) is energized in sequence, data are read from signals received on two sets of loops (47 and an unnumbered loop having the same period as 47 but offset in a phase quadrature relationship—see col. 13, line 10 of Dames. An example of such a system is described in EP 0 760 087 B1, entitled "POSITION ENCODER" and issued to Dames et al. on Apr. 29, 1998, the disclosure of which is hereby incorporated by reference.

In such a system the excitation magnetic flux generated by loops 13 or 15 will be zero at certain points along the length of the array, producing a vulnerability to noise and external signals which sets a limit to accuracy of reading. While this vulnerability exists in systems having sinusoidally-varying pitch, this noise vulnerability may be overcome in a system using constant conductor pitch through the use of a multiphase driving technique, as described below.

In such a technique, conductors are grouped with n conductors in a group. Within each group conductors having the same ordinal position (1,2,3 . . . up to n) are driven with identical AC currents, with the sign of the current alternating with each group of n conductors. Thus, magnetic flux is generated by the equivalent of a series of loops offset by 180/n degrees. The phase of the driving currents between adjacent loops differs by 360/n degrees, resulting in a vector of magnetic flux having maxima which sweep along the length of the array at such a rate that the vector goes through a full cycle in n cycles of the applied current.

Since, for a high-Q resonator a large number of cycles of excitation must be received to allow current to build up, any resonator positioned over this array will receive an equal amount of excitation regardless of location.

In a three-phase implementation of the multiphase drive technique described above, parallel conductors may be divided into groups of three, each of which would be driven by a waveform at the same frequency but separated by 120 degrees in phase. This ensures that any null points in the energizing field will not be stationary, but will instead move rapidly along the array of parallel conductor. Through such multiphase drive techniques, the magnetic energy can be distributed evenly along the array of parallel conductors.

In a configuration with two sets of interleaved conductor pairs having the same spatial frequency and offset by 90 degrees, the signals received from interleaved conductor pairs may be weighted according to the following quadrature-related sinusoidal functions:

$$S(1)=A\cos((2\pi x)/Ts) \quad (1)$$

$$S(2)=A\sin((2\pi x)/Ts) \quad (2)$$

where S is a sensitivity function, A is the peak signal amplitude, x is the distance along the axis of the loops, and Ts is the period of the loops.

Through the previously described means, a uniform exciting field may be generated during the transmit mode, while quadrature-related sinusoidal response patterns of differing periodicity can be expressed during the receive mode. The weighting may be expressed by analog means, such as by using different-valued resistors in operational amplifier circuits, or by digital means, through applying weighted coefficients to digital values produced by analog-to-digital converters reading the output of parallel pairs of conductors.

An additional advantage of the use of constant-pitch conductors is that the exciting magnetic field pattern may be varied as appropriate for detection of the height or tilt of the resonator. Through manipulation of the relative phase of the driving current in different conductors, the effective angular direction of the resultant magnetic field vector may be changed, while the behavior in the receive mode remains unchanged. This may be used to determine the maximum response of a tilted resonator. Also, by using a different current drive for different conductors, magnetic excitation may be increased in the vicinity of a resonator that is displaced from the sensor plane in the z direction to enhance detection. Similarly, interference techniques (such as superposition) may be used to create a maximum in the magnetic field energy at some point above the planar surface so as to concentrate magnetic energy at given locations and thereby enhance the range of detection.

Referring again to FIG. 4, the schematic depicts a receiving array using a plurality of conductors 51-55 with associated terminating resistors R1-R5 and a plurality of differential amplifiers 56-59. Current loops induced by external magnetic fields are shown by currents Ia through Id. Voltages will be generated by resistor pairs R1 and R2 for loop Ia (because of the I-R drop across each resistor), R2 and R3 for Loop Ib, and so on.

Differential instrumentation amplifiers 56-59 are connected between adjacent conductors 51-55 to amplify the voltage differences and present unipolar output voltages proportional to the field intensity. Each amplifier has a voltage gain A(subscript) associated with it; e.g. $A_1$-$A_4$. By adjusting these gains to provide a sinusoidal profile, it is possible to use a constant-spacing array (as in FIG. 3) to simulate the performance of a receiving array having a sinusoidal spatial profile as shown in FIG. 2.

Figure 6:
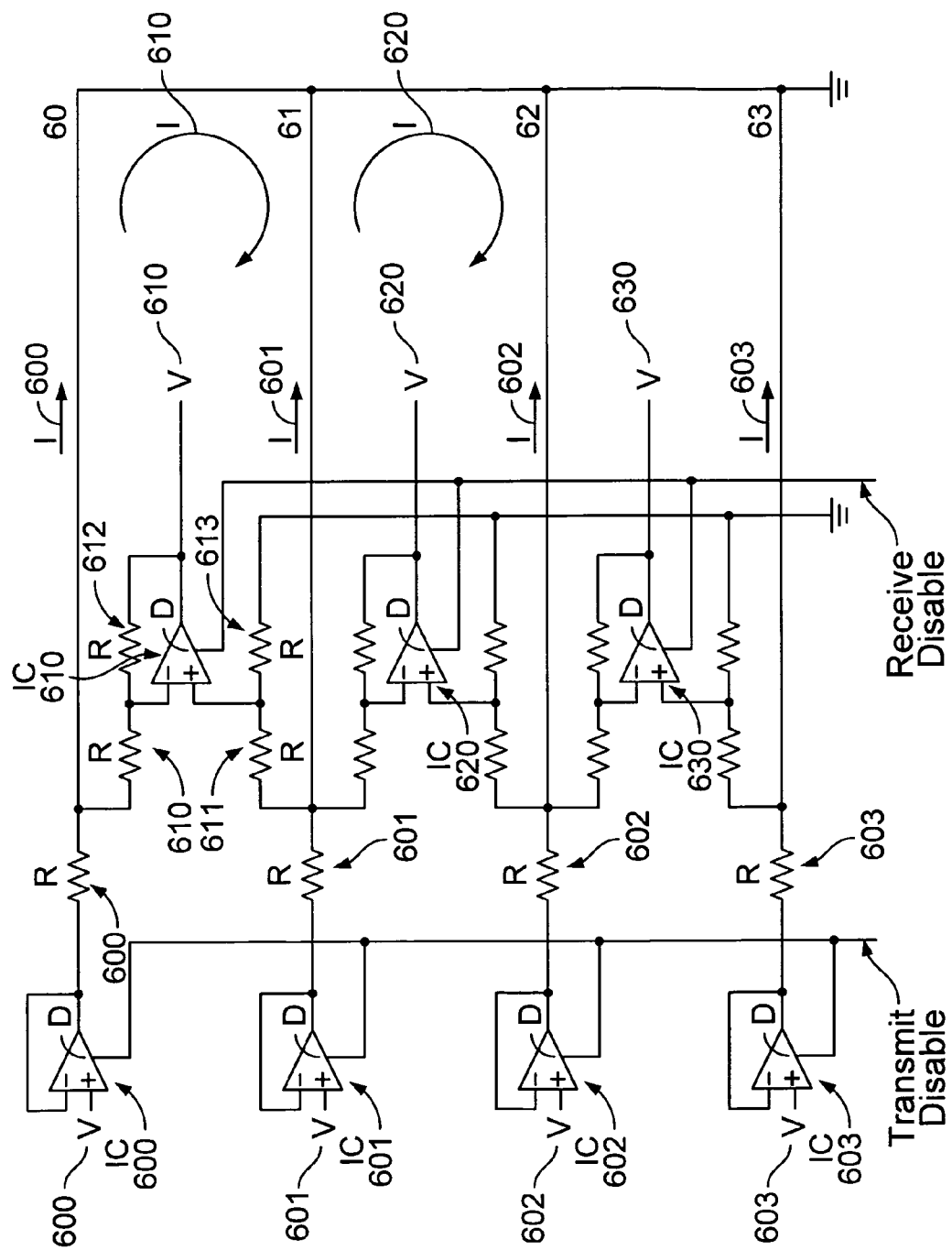
FIG. 6 is a schematic illustrating circuitry for use with an arrangement of windings.

FIG. 6 illustrates analog circuitry for energizing and receiving signals from an array of parallel conductors of any spacing (i.e. usable with the system of FIG. 2 or the system of FIG. 3). A plurality of parallel conductors 60-63 is shown, conducting currents I600-I603 and connecting to signal ground at the bottom right of the circuit.

The drivers are operational amplifiers IC600-IC603 with disable inputs, and are similar to the AD8063 devices described herein. The drivers are connected in a unity-gain feedback configuration and are driven by voltages V600-V603. Resistors R600-R603 determine the drive currents I600-I603 resulting from the input voltages. According to Ohm's law, each current I will be equal to each V/R. By driving voltages V600-V603 with different amplitudes and phases, different magnetic profiles may be generated adjacent to the array of parallel conductors.

The disable inputs to operational amplifiers IC600-IC603 are connected together and driven by a Transmit Disable signal. This signal is driven active when the circuit is in the receive mode and is removed when the circuit is in the transmit mode (energizing). These modes are sequential when a passive resonant circuit (not shown) is used as a location tag element. During transmit, energy accumulates in the resonant circuit that is tuned to the frequency of the driving waveform. When the transmit energy is removed, the resonant circuit "rings down", generating a magnetic field that, through inductive coupling, induces a voltage at the ringing frequency (the resonant frequency of the resonator) in the array of parallel conductors 60-63.

The paths of these induced currents are indicated by loops I610 and I620. These currents will have different magnitudes as a function of the position of the resonating location tag element. Since the drivers IC600-IC603 are disabled at the time of reception, currents I610 and I620 flow through resistors R611, R613, R610, and R612, thus developing voltages across these resistors. Together with operational amplifiers IC610-IC630, the resistor networks constitute differential amplifiers. If the ratio of resistances of resistors R613 and R611 is identical to the ratio of resistances of resistors R612 and R610, then the output voltage V610, referenced to ground, will be equal to this ratio multiplied by the voltage difference between the parallel conductors 60 and 61 connected to R610 and R611, respectively.

The circuitry around IC620 and IC630 is identical in topology to that around IC610, but may differ in having different resistance ratios and therefore different gains.

The receiver operational amplifiers IC610-IC630 are disabled by the Receive Disable signal, which is activated during the transmit phase and for a short period thereafter, to avoid saturation of the amplifiers due to voltages developed by the drive currents I600-I603 across conductor resistances and inductances.

Figure 7:
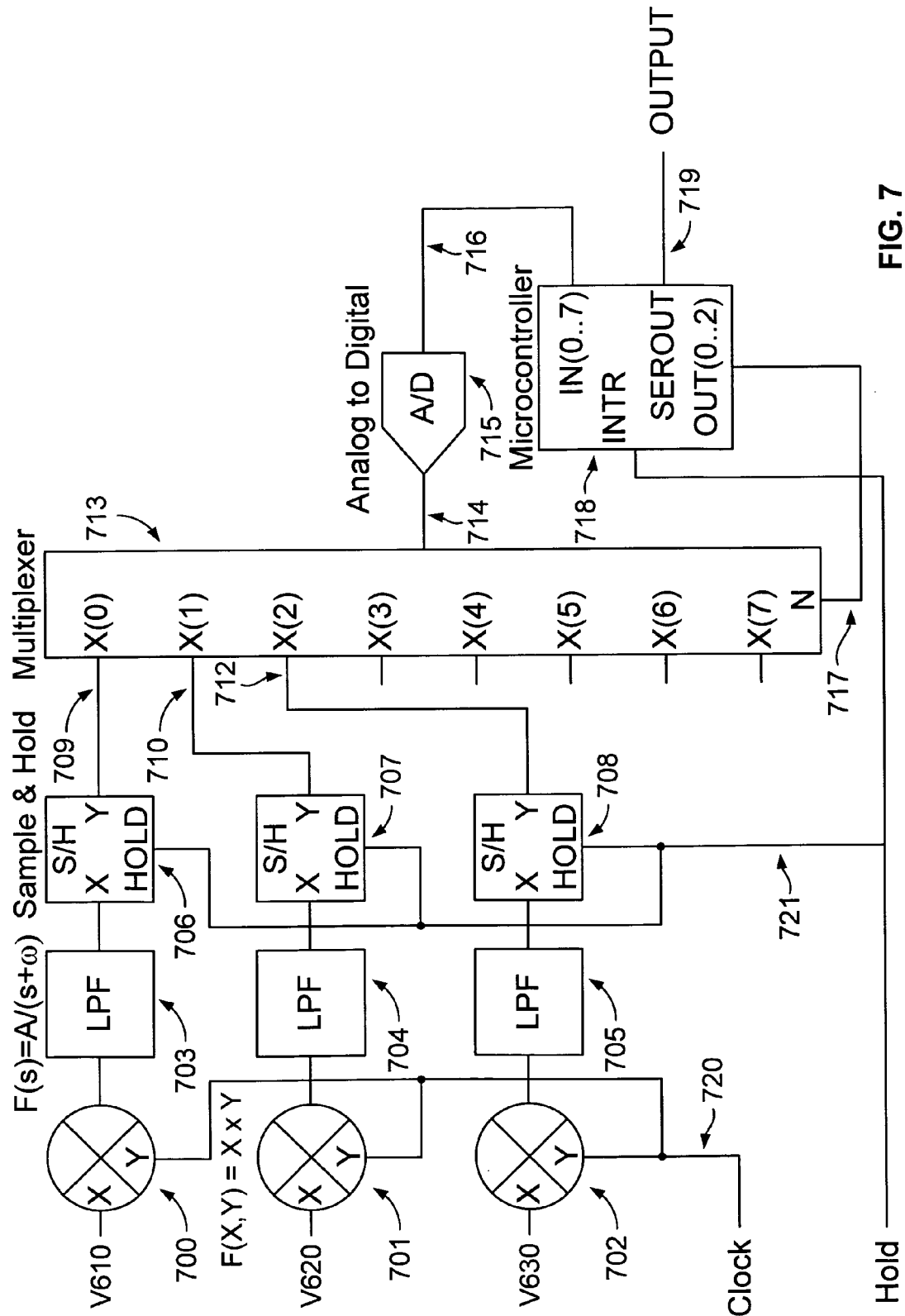
FIG. 7 is a schematic illustrating circuitry for measuring amplitudes of the signals received by the circuitry of FIG. 6.

FIG. 7 illustrates circuitry that may be used for measuring the amplitudes of signals received by the circuitry of FIG. 6. Signals V601, V602, and V603 are the output signals from the circuitry shown in FIG. 6, and are fed to the X inputs of multiplier circuits 700, 701, and 702, respectively. The Y inputs of these multipliers 700-702 are connected together through connector 720 and are driven by a signal "Clock" which is derived from circuitry (not shown) generating the transmitting frequency. The multipliers 700-702 act as synchronous detectors that present a DC value at the output that is proportional to the signal amplitude at the input. Other components of the cross product of the X and Y inputs will be at high frequencies and are removed by the filtering action of the low-pass filters 703, 704, and 705.

The outputs of low-pass filters 703-705 are connected to the X inputs of sample-and-hold circuits 706, 707, and 708, respectively. These circuits will hold their Y outputs at the level determined by the X inputs when the HOLD input becomes active. The HOLD inputs of these circuits are connected by connector 721 and are driven by timing circuitry (not shown) that controls the timing of the system, and may be identical with the Receive Disable signal of FIG. 7.

The Y outputs of the sample-and-hold circuits 706-708 are connected by connectors 709, 710, and 712 respectively to inputs X(0), X(1) and X(2) of the 8-channel analog multiplexer 713. The remaining five inputs of this multiplexer are shown for clarity, and should be considered as being connected to five additional channels of circuitry (omitted for the sake of clarity) identical to the three channels shown in the diagram. The analog multiplexer 713 creates a connection between one of the inputs X(n) and the output Y as determined by the binary number driven on the N inputs through a 3-conductor connection 717. Thus, the multiplexer operates as a switch connecting the output Y to the input X(n) where n is represented by the binary number expressed at the N inputs, here shown as a single input.

Microcontroller 718 drives the channel selection lines 717 from its OUT(0 . . . 2) signals. This microcontroller contains a microprocessor, clock generator, random-access memory, and read-only memory, and may be similar to the PIC16C54 manufactured by Microchip Technology, Inc., 2355 West Chandler Blvd., Chandler Ariz. 85224. The operation of microcontroller 718 is controlled by a program stored in internal read-only memory. The interrupt input INTR of microcontroller 718 is driven by connector 721 from the HOLD signal, and serves to synchronize the microcontroller operation to the operation of the system. Inputs IN(0 . . . 7) are a set of eight digital signals which receive an eight-bit binary number from conductors 716. These conductors are driven by the eight-bit wide output of analog-to-digital converter 715. The analog input to analog-to-digital converter 715 is driven by the Y output of multiplexer 713 through conductor 714. Timing and control connections to the analog-to-digital converter 715 are not shown.

The circuit of FIG. 7 operates as follows: upon receipt of the HOLD signal the sample-and-hold circuits 706, 707, and 708 hold their Y outputs at the levels received from the low-pass filters 703, 704, and 705 respectively. These filters continuously receive their inputs from the multipliers 700, 701, and 702 respectively. Through integrating action, the low-pass filters tend to accumulate a DC level that is proportional to the amplitude of the "ringing down" signals V610, V620, and V630. These DC levels are present at the inputs of the multiplexer 713.

Upon receipt of the HOLD signal at its INTR input, microcontroller 718 enters a section of its program that performs the following operations:
1. Output a binary "000" channel number at OUT(0 . . . 2)
2. Delay long enough for analog-to-digital converter 715 to effect a conversion
3. Input the data from inputs IN(0 . . . 7)
4. Multiply the value received by two scaling factors stored internally. These scaling factors express the sine and cosine spatial functions as described in Equations No. 1 and 2, given above.
5. Store the two values resulting from these multiplications in random-access memory
6. Increment the binary channel number
7. Test the channel number to see if it has reached 1000
8. If the test returns a true condition, exit the program and await the next interrupt signal
9. If the test returns a false condition, output the channel number to OUT(0 . . . 2) and jump to step 2.

While the microcontroller 718 is awaiting a further interrupt signal, it may transmit the received scaled number pairs to an external computer through its serial output signal 719, or it may perform further processing upon these numbers that might otherwise be performed by an external computer.

Figure 8:
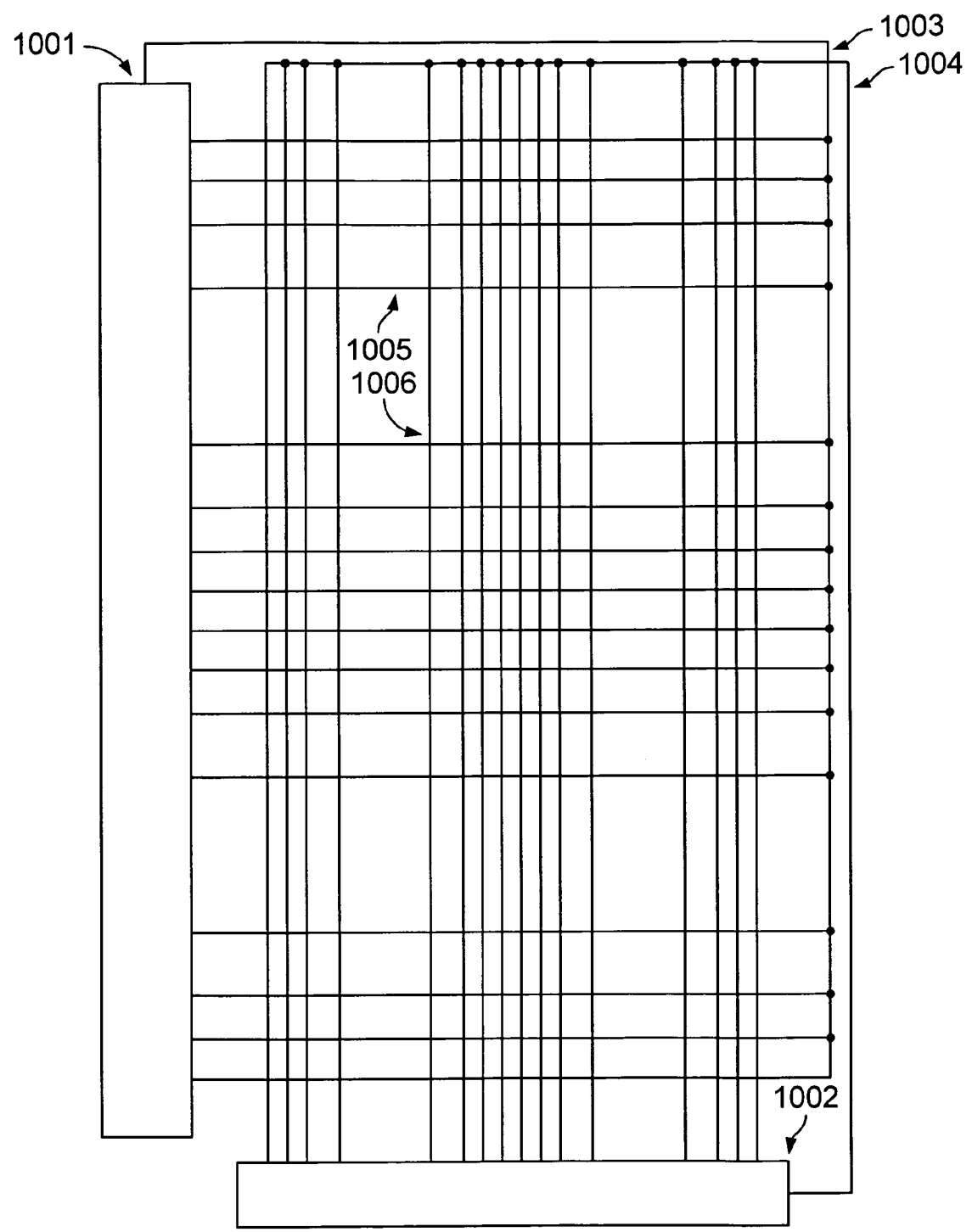
FIG. 8 is a schematic illustrating an arrangement of windings incorporating the arrangement of FIG. 2, configured for detecting positions in a plane.

FIG. 8 depicts a two-dimensional array of conductors arranged in a sinusoidal spacing profile. Horizontal conductors (e.g., 1005) are driven by circuitry in electronics block 1001 and received signals are processed in electronics block 1001. Vertical conductors (e.g., 1006) are driven by circuitry in electronics block 1002 and received signals are processed in electronics block 1002. Unbalanced current from the horizontal conductor array is returned to electronics block 1001 through conductor 1003, and unbalanced current from the vertical array is returned to electronics block 1002 by conductor 1004.

This diagram depicts one layer of a structure that would in practice include four layers. One layer not shown would be identical to the structure shown but having the sinusoidal spacing profiles shifted by 90 degrees in each axial dimension. Two additional layers would be similar to the one shown and the shifted layer described but not shown, with the difference that the sinusoidal profile on each layer goes through two cycles in the same length as the one cycle shown.

Figure 9:
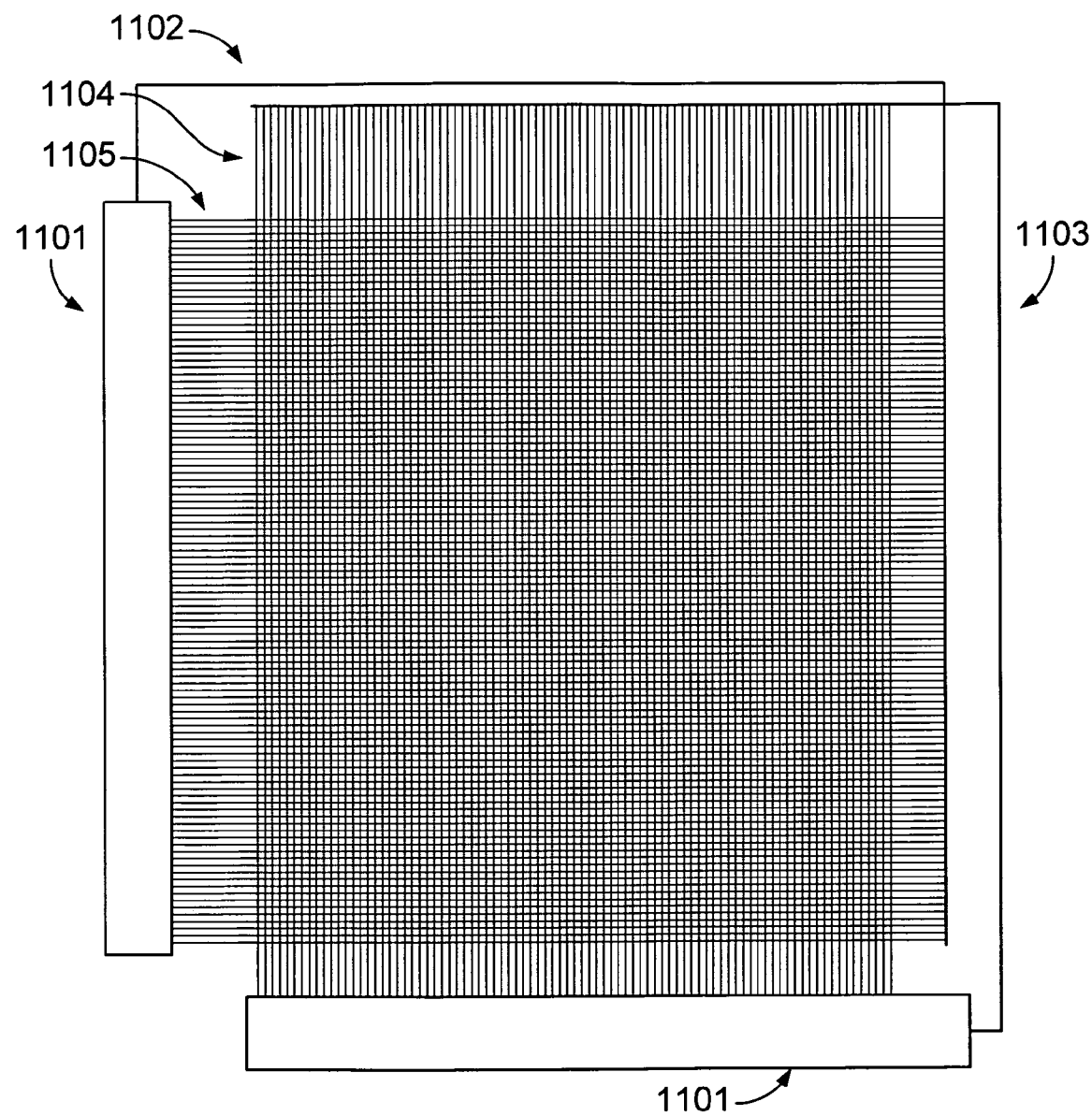
FIG. 9 is a schematic illustrating another arrangement of windings incorporating the arrangement of FIG. 3, configured for detecting positions in a plane.

FIG. 9 depicts a two-dimensional sensor array built using constant spacing between parallel conductors. Vertical conductors (e.g., 1104) are driven by circuitry in the electronics block 1106 and unbalanced current is returned to the electronics block 1106 through conductor 1103. Circuitry for processing signals received through vertical conductors (e.g., 1104) is also contained in electronics block 1106.

Horizontal conductors (e.g., 1105) are driven by circuitry contained in electronics block 1101, with unbalanced current returned through conductor 1102. Circuitry for processing signals received by the horizontal conductors is also contained in electronics block 1101.

Because sinusoidal sensitivity profiles of various phase and periodicity may be generated through processing techniques in the electronic blocks 1101 and 1106, no additional layers of conductors are required to create a functional two-dimensional sensing array. Also, various techniques of excitation may be applied by circuitry in the electronics blocks 1101 and 1106 in order to ensure that a resonator placed over the array will receive driving flux distributed evenly over the array.

Figure 10:
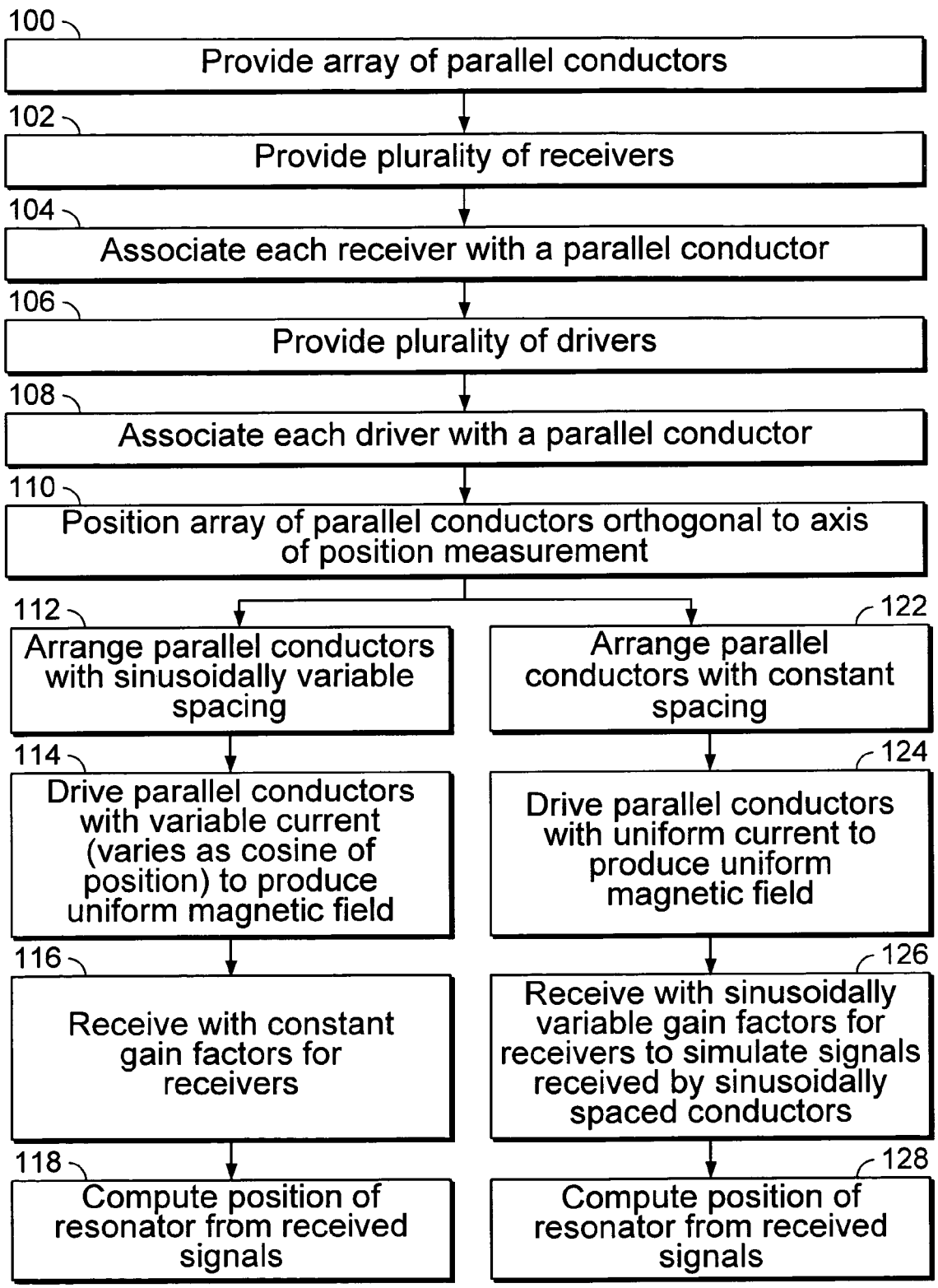
FIG. 10 is a diagram illustrating a process flow.

FIG. 10 shows a process flow in accordance with the embodiment described herein. In step 100, an array of parallel conductors is provided. In step 102, a plurality of receivers is provided. Each receiver is associated with a parallel conductor, step 104. Similarly, a plurality of drivers is provided, step 106, and each driver is associated with a parallel conductor, step 108. In step 110, the array of parallel conductors is configured so that the parallel conductors are orthogonal to the axis of position measurement. The parallel conductors may be spaced with sinusoidally variable spacing, step 112. In this case, the parallel conductors are driven with variable current (which varies as the cosine of the position of the parallel conductor) to provide a relatively uniform field, step 114. The receivers are activated to receive signals from the parallel conductors with constant gain factors, step 116. In step 118, the position of the object is computed from the received signals. Alternatively, instead of sinusoidally variable spacing, the parallel conductors may be spaced with constant spacing, step 122. In this case, the parallel conductors are driven with constant current to provide a relatively uniform field, step 124. In step 126, the receivers are activated to receive signals from the parallel conductors with variable gain factors to simulate signals received by sinusoidally spaced conductors. In step 128, the position of the object is computed from the received signals.

Figure 11:
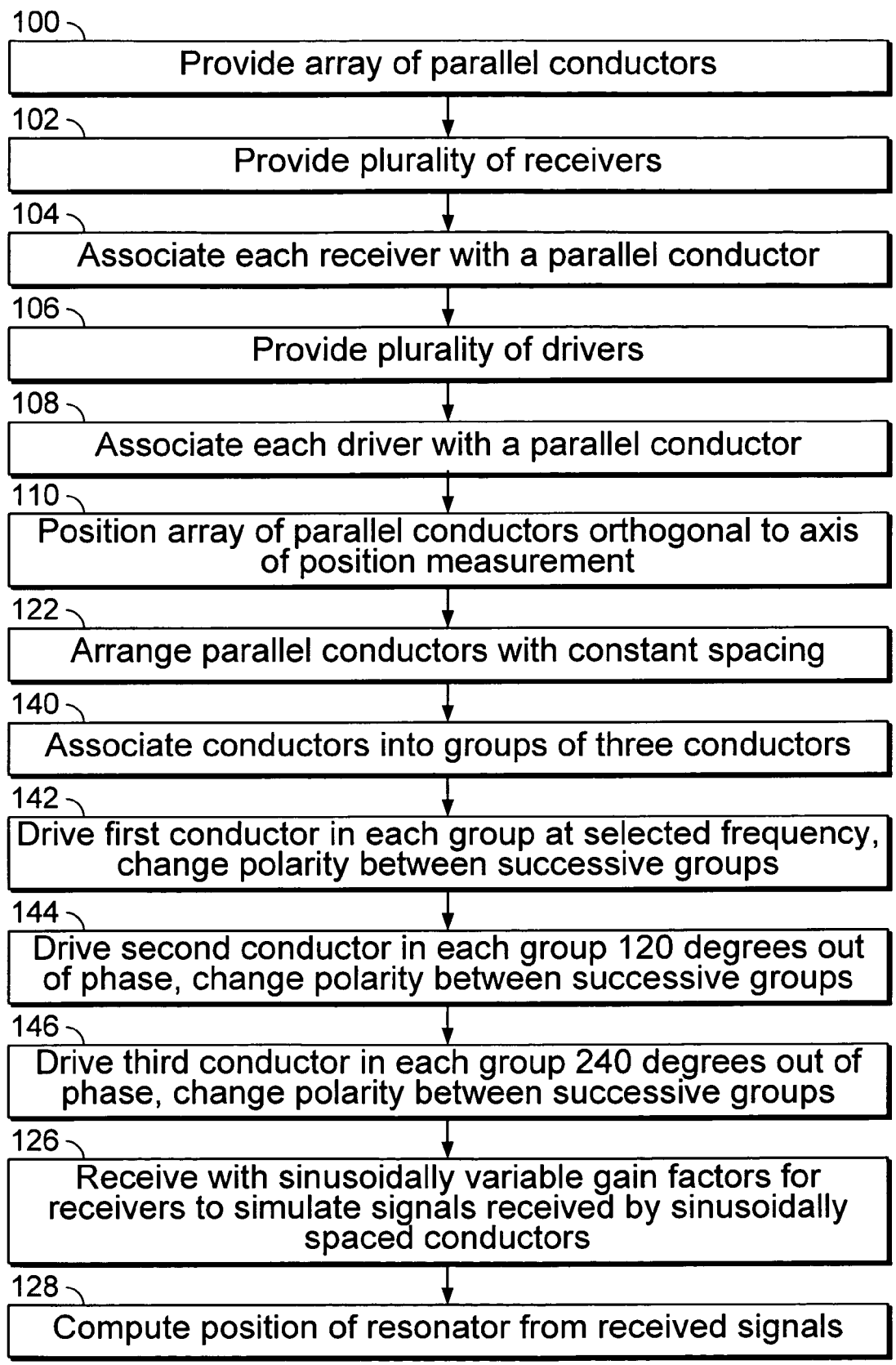
FIG. 11 is a diagram illustrating a process flow similar to that of FIG. 10, adapted for multiphase drive current.

FIG. 11 shows another embodiment in which multiple phase drive is used. The process flow is similar to that of FIG. 10, including spacing the parallel conductors with constant pitch in step 122. To illustrate the multiphase drive described herein, a three-phase drive is shown. In step 140, the conductors are arranged into groups of three. In step 142, the first conductor in each group is driven by a current at a selected frequency, with the polarity being alternated between successive groups (i.e. the first conductor in the first group is driven by a selected current, the first conductor in the second group is driven by an opposite of the selected current, the first conductor in the third group is driven by the selected current, and so on). The second conductor in each group is driven by the same current as the first conductor but 120 degrees out of phase, again alternating polarity between groups, step 144. Similarly, the third conductor in each group is driven by the same current as the first conductor but 240 degrees out of phase (120 degrees out of phase with the second conductor drive current), alternating polarity between groups, step 146. Step 126 shows that the signals from the resonator are received with variable gain factors to simulate signals received by sinusoidally spaced conductors. In step 128, the position of the object is computed from the received signals.

Figure 12:
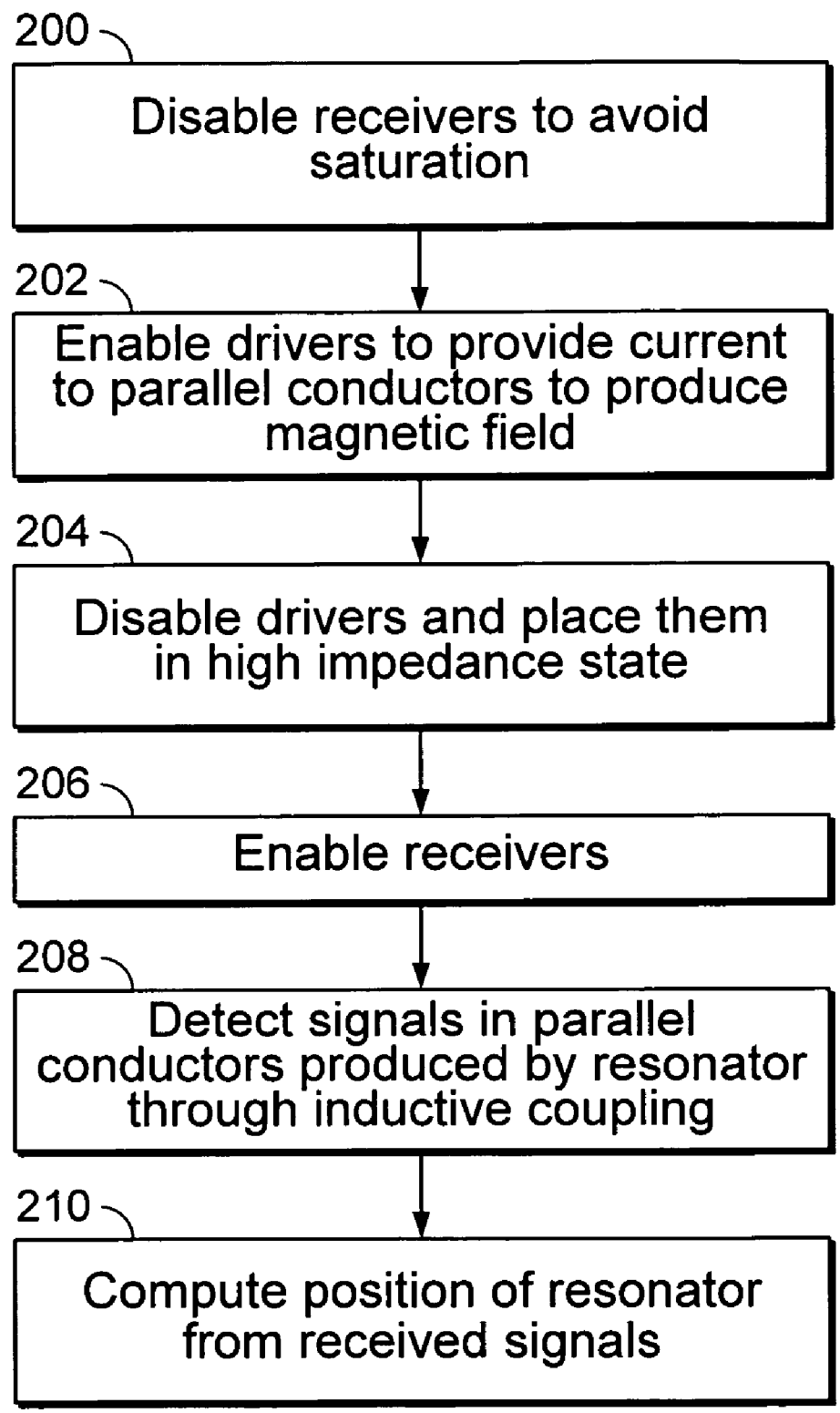
FIG. 12 is a diagram illustrating a process flow for operating the drivers and receivers.

Another process flow is shown in FIG. 12, and may be implemented in a processor. In step 200, the receivers are disabled to avoid saturation of the operational amplifiers. In step 202, the drivers are enabled to provide current to the array of parallel conductors in order to generate a magnetic field. In step 204, the drivers are disabled and placed in a high impedance state. The receivers are enabled in step 206, and receive signals in the parallel conductors produced by the resonator through inductive coupling, in step 208. The position of the resonator is computed from the received signals in step 210.

For the sake of clarity, the process has been illustrated with a specific flow, but it should be understood that other sequences are possible and that some may be performed in parallel, without departing from the spirit of the invention. Additionally, steps may be subdivided or combined.

A system and method for detecting position of objects have been disclosed. More particularly, a system and method for non-contact detection of positions of objects relative to planar areas have been disclosed. Software may be stored in some form of computer-readable medium, such as memory or CD-ROM, or transmitted over a network, and executed by a processor. Additionally, in the methods disclosed herein, various steps may be performed simultaneously or in sequences other than as disclosed, without departing from the scope of the invention.

Although the present invention has been described in accordance with the embodiments shown, one of ordinary skill in the art will readily recognize that there could be variations made to the embodiments without departing from the scope of the present invention. For example, the concepts presented herein could be applied to other types of position detectors, such as rotational position detectors, with conductors that are parallel to each other but not necessarily linear. Accordingly, it is intended that all matter contained in the above description and shown in the accompanying drawings shall be interpreted as illustrative and not in a limiting sense.

What is claimed is:

1. A position detection system for locating an object including a magnetic field generator, comprising:
    an array of parallel conductors responsive to a magnetic field generated by the magnetic field generator; and
    a plurality of receivers each associated with a parallel conductor, wherein the parallel conductors are spaced apart from one another by a substantially constant spacing,
    and wherein each receiver has an associated gain, and wherein the gains of the receivers are configured to simulate voltages induced in conductor loops of sinusoidally-varying pitch.

2. A position detection system for locating an object including a magnetic field generator, comprising:
    an array of parallel conductors responsive to a magnetic field generated by the magnetic field generator; and
    a plurality of receivers each associated with a parallel conductor, wherein the parallel conductors are spaced apart from one another by a substantially constant spacing,
    and wherein each receiver has an associated gain, and wherein the gains of the receivers are configured to produce a desired profile.

3. The system as recited in claim 2, wherein the desired profile includes at least one of a desired frequency and a desired phase.

4. The system as recited in claim 3, wherein the desired profile is a sinusoidal profile.

5. The system as recited in claim 3, wherein the sinusoidal profile is produced by varying each gain sinusoidally according to a position of the parallel conductor in the array of parallel conductors.

6. A position detection system for locating an object including a magnetic field generator, comprising:
    an array of parallel conductors responsive to a magnetic field generated by the magnetic field generator, wherein the parallel conductors are associated into groups of three;
    a plurality of receivers each associated with a parallel conductor, wherein the parallel conductors are spaced apart from one another by a substantially constant spacing;
    a plurality of drivers each associated with a parallel conductor and configured to drive a current through to produce an energizing field, wherein the drivers associated with the parallel conductors in the groups are configured to produce drive currents at a first frequency and in three phases, and wherein the three phases are separated by 120 degrees.

7. The system as recited in claim 6, wherein each parallel conductor in a group is driven by a drive current that is 120 degrees out of phase with a drive current in an adjacent parallel conductor.

8. The system as recited in claim 7, wherein a sign of the drive currents in each group is opposite of a sign of the drive currents in an adjacent group.

9. A method for detecting position of an object including a resonator, comprising:
    associating a receiver with a parallel conductor, wherein the receiver is one of a plurality of receivers, and wherein the parallel conductor is one of a plurality of parallel conductors in an array; and wherein the parallel conductor is responsive to a resonator; and
    configuring the array of parallel conductors to locate the object along a measurement path;
    associating each parallel conductor with a driver wherein the driver is one of a plurality of drivers; and
    conveying the detected position.

10. The method as recited in claim 9, further comprising using each driver to drive current through the associated parallel conductor to produce an energizing field.

11. A method for detecting position of an object including a resonator in a position detection system including an array of parallel conductors and a plurality of drivers and receivers each associated with a parallel conductor, comprising:
    disabling the receivers to avoid saturation;
    enabling the drivers to provide current to the array of parallel conductors to generate a magnetic field and excite a resonator;
    disabling the drivers and placing them in a high impedance state;
    enabling the receivers;
    receiving signals from the parallel conductors produced by the resonator through inductive coupling;
    computing the position of the resonator; and
    conveying the detected object position.

12. A computer program product for use in a position detection system including an array of parallel conductors and a plurality of drivers and receivers each associated with a parallel conductor, comprising a computer usable medium having machine readable code embodied therein for:
    disabling the receivers to avoid saturation;
    enabling the drivers to provide current to the array of parallel conductors to generate a magnetic field and excite a resonator;
    disabling the drivers and placing them in a high impedance state;
    enabling the receivers;
    receiving signals from the parallel conductors produced by the resonator through inductive coupling;
    computing the position of the resonator; and
    conveying the detected object position.

* * * * *

UNITED STATES PATENT AND TRADEMARK OFFICE
CERTIFICATE OF CORRECTION

| | | |
|---|---|---|
| PATENT NO. | : 7,257,506 B2 | Page 1 of 1 |
| APPLICATION NO. | : 11/007067 | |
| DATED | : August 14, 2007 | |
| INVENTOR(S) | : Felsenstein et al. | |

It is certified that error appears in the above-identified patent and that said Letters Patent is hereby corrected as shown below:

In column 4, line 45, after "system" insert -- . --.

In column 5, line 2, after "herein" insert -- . --.

In column 5, line 50, after "position" insert -- . --.

In column 6, line 40, after "Mass." insert -- , --.

In column 9, line 37, delete "1603" and insert -- I603 --, therefor.

In column 9, line 57, delete "1610" and insert -- I610 --, therefor.

Signed and Sealed this

Seventeenth Day of June, 2008

JON W. DUDAS
*Director of the United States Patent and Trademark Office*